United States Patent [19]

Covington et al.

[11] Patent Number: 5,616,077
[45] Date of Patent: Apr. 1, 1997

[54] CONTROL SYSTEM FOR A COTTON HARVESTER

[75] Inventors: Michael J. Covington, LaGrange, Ill.; David M. Brandt, Council Bluff, Iowa; James W. Robinson, Orion, Ill.

[73] Assignee: Case Corporation, Racine, Wis.

[21] Appl. No.: 494,231

[22] Filed: Jun. 23, 1995

[51] Int. Cl.⁶ .................................................. A01D 46/10
[52] U.S. Cl. .............................. 460/119; 460/115; 56/30; 56/16.6
[58] Field of Search ..................... 460/119, 114, 460/115; 56/28, 30, 16.4, 16.6

[56] References Cited

U.S. PATENT DOCUMENTS

| | | | |
|---|---|---|---|
| 4,606,177 | 8/1986 | Schlueter | 56/28 X |
| 4,930,297 | 6/1990 | Schlueter et al. | 56/28 X |
| 4,996,831 | 3/1991 | Pearson et al. | 56/28 X |
| 5,167,581 | 12/1992 | Haag | 460/114 |

*Primary Examiner*—Terry Lee Melius
*Attorney, Agent, or Firm*—Rudnick & Wolfe

[57] ABSTRACT

A cotton harvester receptacle including a lower basket portion and upper basket portion arranged for elevational movement relative to the lower basket portion the cotton receiving receptacle further includes a hood assembly mounted for generally linear movement along a generally horizontal path of travel between a retracted position and an extended position. In an extended position, the hood assembly is positioned to guide harvested materials exhausted from a discharge end of a cotton conveying duct structure into the receptacle. To facilitate elevational movements of the upper basket portion of the receptacle, a control system moves the upper basket portion of the receptacle and the hood assembly in timed sequential relation relative to each other.

19 Claims, 5 Drawing Sheets

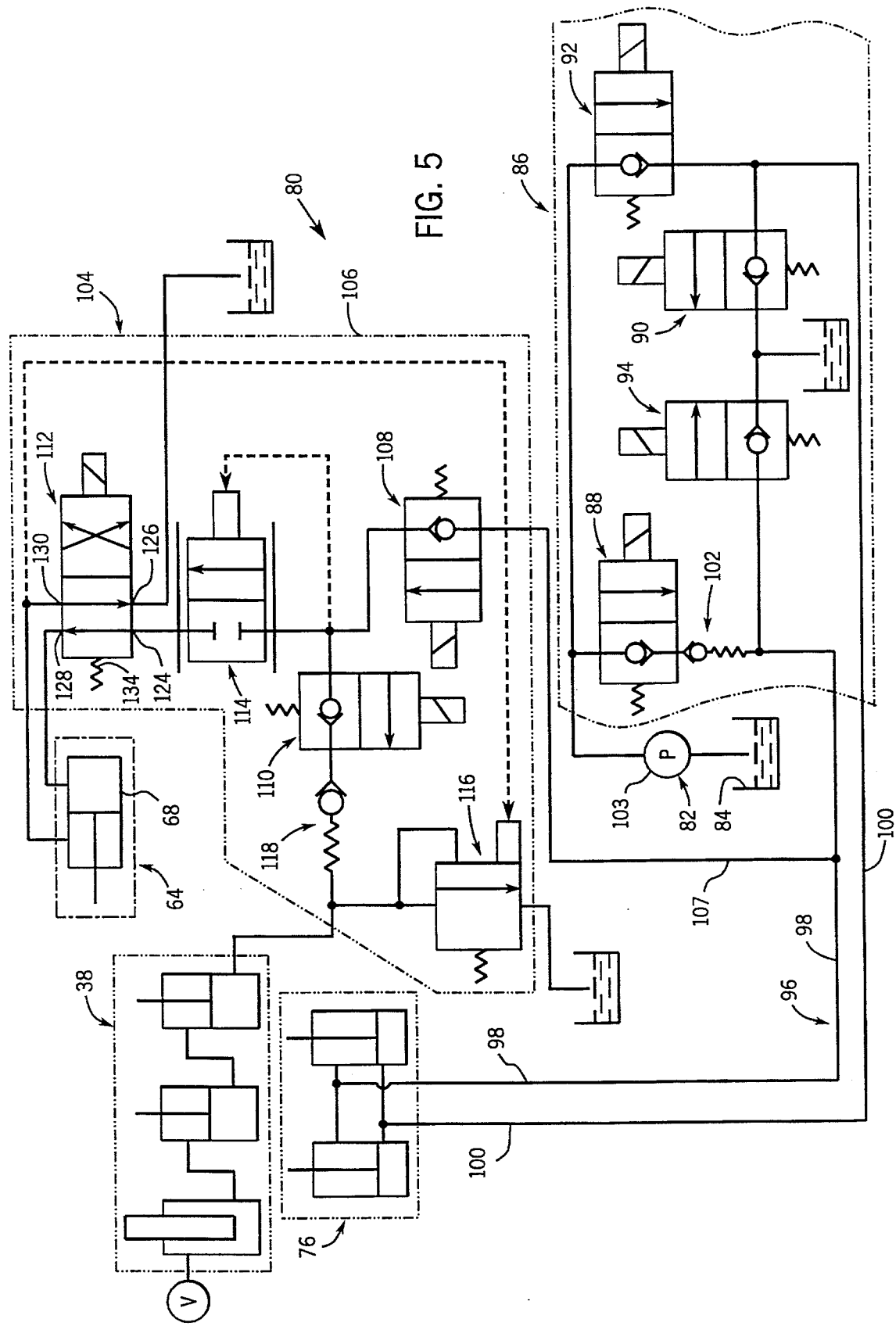

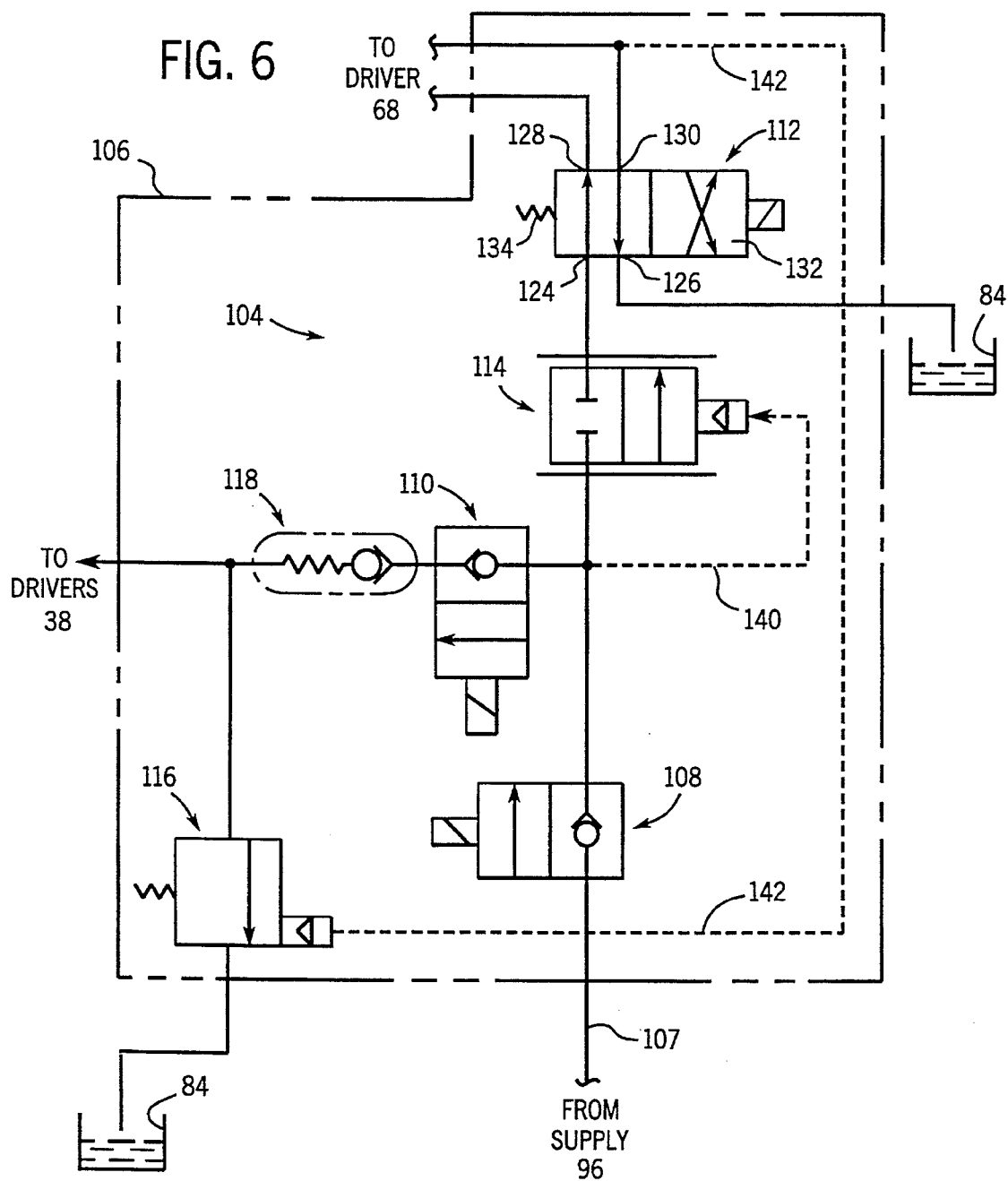

CONTROL SYSTEM FOR A COTTON HARVESTER

FIELD OF THE INVENTION

The present invention generally relates to cotton harvesters and, more particularly, to a cotton harvester having a receptacle including an upper basket portion that is elevationally movable relative to a lower basket portion, with the upper basket portion having a hood assembly for guiding harvested cotton materials exhausted from cotton conveying duct structure into the receptacle, and wherein a control system is provided for coordinating the movements of the hood assembly and upper basket portion of the receptacle relative to each other.

BACKGROUND OF THE INVENTION

Modern cotton harvesters include relatively large high volume receptacles that are mounted to a frame of the harvester for holding harvested cotton materials received from harvesting structure mounted on the frame of the harvester. The receptacle typically includes a lower basket portion with an upper basket portion mounted thereon for elevational movement between a raised field working position and a retracted storage position. Moreover, drivers are provided for moving the lower basket portion between an operational position and a cotton discharge position.

Although beneficially increasing the capacity of the receptacle maintaining the upper basket portion in the field working position presents certain problems and drawbacks. Because of shipping size limitations, the upper basket portion must be moved to its retracted storage position when the harvester is freighted by rail or truck. Because of power lines and the like, the increased height of the receptacle provided with the upper basket portion in a raised field working position, makes it difficult to transport the harvester from one location to another. Moreover, the normal height of barn doors makes moving the harvester indoors for repairs or storage a problem because of the increased height added to the receptacle by the upper basket portion.

A conventional cotton harvester further includes cotton conveying duct structure extending upwardly from the harvesting structure. To optimize the cotton holding capacity of the receptacle, the cotton conveying duct structure extends to a top forward portion of the upper basket portion whereat cotton materials are introduced into the receptacle. To allow the upper basket portion of the receptacle to vertically move relative to the lower basket portion without interfering or impacting with the cotton conveying duct structure, a gap or opening separates the distal end of the cotton conveying structure from the receptacle.

To promote the delivery of cotton materials from the duct structure into the receptacle, the upper basket portion further includes a hood assembly that bridges the gap or opening separating the discharge end of the duct structure from the receptacle. The hood assembly includes rigid hood structure that extends outwardly from the top forward portion receptacle, extends vertically over and partially surrounds the discharge end of the duct structure. The hood assembly includes rigid hood structure that outwardly extends from the top forward portion of the receptacle vertically over and partially surrounds the duct structure to define a channel through which cotton materials are guided toward the receptacle.

While the height of the duct structure can exceed the desire transportation height of the harvester, lowering the upper basket portion to a retracted storage position involves a significant amount of effort to disassemble portions of the receptacle. The upper basket portion of the receptacle is typically maintained in its raised or transport position by a series of bolts fastened about the periphery of the receptacle. Each bolt needs to be unfastened before the upper basket portion can be elevationally positioned relative to the lower basket portion. Moreover, and as mentioned, a portion of the hood structure of the hood assembly is arranged to extend over and surround the distal end of the duct structure. Accordingly, the hood structure comprising the hood assembly needs to be removed before the upper basket portion can be lowered to a retracted position. Unless the hood assembly is removed or retracted prior to the upper basket portion being moved to a storage position, significant damage to the duct structure can result with the upper basket portion being retracted and the hood assembly in an extended position. A customer, for example who desires to transport the cotton harvester from one location to another, therefore, must often spend a considerable number of man hours in tearing down and setting up the receptacle, thereby reducing the overall productivity and efficiency of the harvester.

As mentioned above, the lower basket portion is provided with drivers for moving the receptacle between an operational position and a cotton discharging position. In one form, the upper basket portion of the receptacle is provided with drivers for positioning it between its storage and field working positions. Typically, such drivers include two or more hydraulic cylinders. Each cylinder is typically provided with hydraulic supply and return lines that connect the cylinder to a suitable source of fluid pressure mounted on the harvester. As will be appreciated by those skilled in the art, because of their size and significant weight of the components to be moved by the hydraulic drivers, such hydraulic lines are required to withstand substantially significant hydraulic pressures and, because of their length, add to the overall manufacturing costs of the harvester. Adding further elongated hydraulic lines and conduits to the harvester further complicates the hydraulic circuitry already existing with the harvester.

Thus, there is a need and a desire for a large capacity two-piece cotton receiving receptacle having a hood assembly and wherein the hood assembly and an upper basket portion of the receptacle are movable in timed relation relative to each other to promote efficiency and effectiveness of the harvester by reducing downtime and to inhibit damage to the duct structure upon movement of the upper basket portion to a lower storage position.

SUMMARY OF THE INVENTION

In view of the above and in accordance with the present invention, there is provided a relatively large capacity receptacle for cotton harvester. The receptacle includes a lower basket portion and an upper basket portion arranged for movement relative to the lower basket portion. Duct structure extending from the harvesting structure mounted on the harvester exhausts harvested cotton materials into the receptacle. The receptacle further includes a movable hood assembly for guiding cotton materials into the receptacle. A salient feature of the present invention relates to a control system for moving the upper basket portion of the receptacle and the hood assembly in timed relation relative to each other.

The hood assembly includes hood structure mounted on the upper basket portion of the receptacle for movement between an extended position and a retracted position. In an extended position, the hood structure extends partially over and about a distal end of the duct structure to captively guide materials exhausted from the duct structure into the receptacle. In its retracted position, the hood structure is removably spaced from the duct structure thereby allowing the upper basket portion to be lowered into a retracted storage position without interfering with the duct structure or without requiring any further manipulation of the duct structure to effect such ends.

The control system of the present invention includes a first actuator for telescopically moving the upper basket portion relative to the lower basket portion between a first or lowered storage position and a second or raised field working position. A second actuator moves the hood assembly between its extended and retracted positions relative to the upper basket portion. The control system further includes circuitry for operating the first and second actuators in timed relation relative to each other. That is, the control system of the present invention sequentially operates the actuators such that the hood assembly is moved to a retracted position prior to the upper basket portion being moved to its lowered storage position and whereby the upper basket portion is moved to its raised field working position prior to the hood assembly being moved to its extended position.

In a preferred form of the invention, the first actuator includes a pair of hydraulically interconnected extendable/retractable hydraulic cylinders for elevationally moving the upper basket portion relative to the lower basket portion. The second actuator preferably comprises and extendable/retractable cylinder connected between the hood assembly and the upper basket portion of the receptacle for moving the hood assembly between its extended and retracted positions.

Interfaced with the hydraulic actuators used to position the basket portions of the receptacle and the hood assembly, the control system of the present invention preferably comprises electro/hydraulic circuitry interposed between a fluid pressure source and the hydraulic actuators. Such circuitry includes valves for actuating a selected one of the actuators and preventing simultaneous operation of the other one of the actuators.

Operator controlled valves selectively operate the hood assembly and position the upper basket portion relative to the lower basket portion of the receptacle. In a preferred form of the invention, a valve body is mounted on the receptacle and includes the valves interposed between the fluid pressure source and the actuators.

In one embodiment of the invention, the lower basket portion of the receptacle includes a door through which cotton materials are discharged from the receptacle. Door/open close circuitry selectively connects a source of fluid pressure to a door actuator thereby allowing the door to be selectively moved between open and closed positions. To reduce the number of hydraulic lines extending from the fluid pressure source, in a most preferred form of the invention, the electro/hydraulic circuitry for positioning the upper basket portion relative to the lower basket portion and for moving the hood assembly between extended and retracted positions is hydraulically interconnected to the door open/close circuitry on the harvester.

Accordingly, an advantage of the present invention relates to providing a control system which, in combination with a telescoping basket, obviates the need for on-site basket assembly and disassembly. The present invention provides a relatively simple control system for operating the components of the cotton harvester in timed relation relative to each other. With the present invention, the height of the receptacle can be adjusted to promote capacity during operation of the harvester and which allows the height of the receptacle to be significantly reduced to facilitate transport of the harvester. It is a further object of the present invention to provide a control system including pressure sequencing valves for operating the hood assembly and basket structure in timed relation relative to each other. By including a control system wherein systematic movement and operation of the hood assembly and upper basket portion are controlled through electro/hydraulic circuitry, the possibility of human error resulting in significant damage to the duct structure is significantly reduced.

These and other objects, features and advantages of the present invention will be become readily apparent to those skilled in the art from the description which follows and from the drawings.

BRIEF DESCRIPTION OF THE DRAWINGS

FIG. 5 is a schematic representation of a system for controlling component parts of the cotton receiving receptacle;

FIG. 6 is an enlarged schematic illustration of a portion of the control system illustrated in FIG. 5.

DETAILED DESCRIPTION OF A PREFERRED EMBODIMENT

Figure 1:
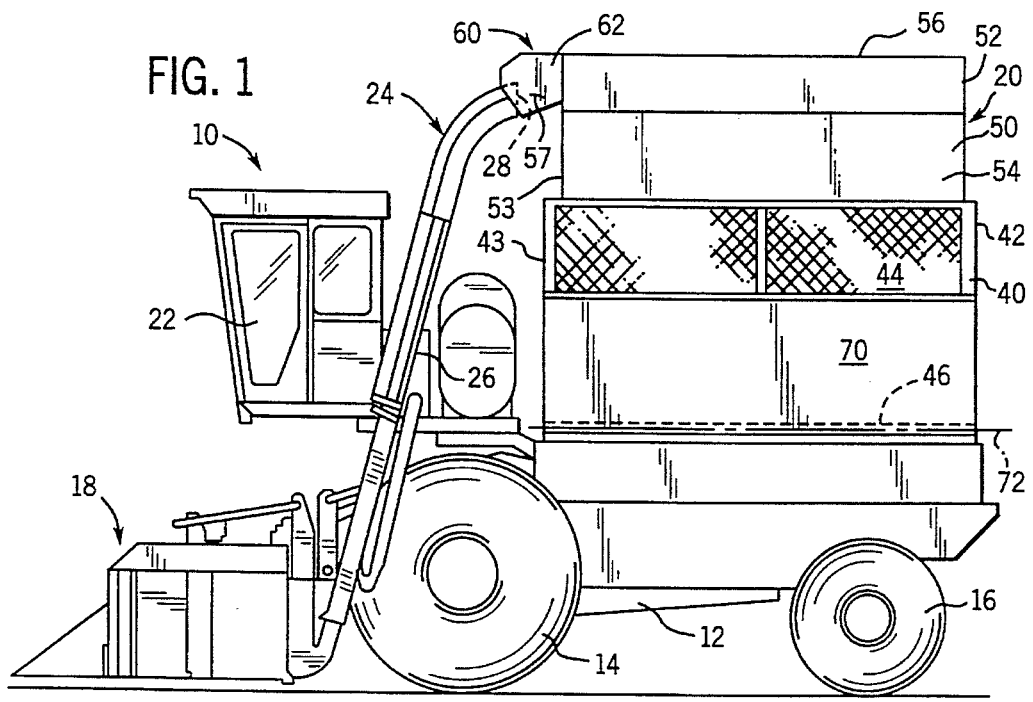
FIG. 1 is a side elevational view of a cotton harvester receptacle with which the present invention finds utility.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, a cotton harvester is generally indicated in FIG. 1 by reference numeral 10. Suffice it to say, cotton harvester 10 is of the type sold by Case Corporation of Racine, Wis. under Model No. 2100. More particularly, harvester 10 includes a self-propelled frame 12 supported on a pair of front drive wheels 14 and a pair of rear steerable wheels 16.

Harvester 10 further includes harvesting structure 18 preferably comprised of a plurality of cotton harvesting units mounted across the front end of the harvester for picking or stripping cotton from rows of cotton plants as the harvester is driven through the field. As is conventional, the harvesting units are supported in side-by-side relation relative to each other across a front end of the harvester 10. In the illustrated embodiment, a cotton receiving receptacle 20 is mounted on the frame 12 rearwardly of a driving compartment or cab 22. The compartment 22 is preferably configured as an enclosure for the operator and where the controls for operating the harvester are located.

As shown in FIG. 1, cotton material conveying or elevating duct structure, generally designated by reference numeral 24, is operatively associated with an upwardly extends from the harvesting structure 18 for directing harvested cotton materials to the receptacle 20. In the illustrated embodiment, a conventional fan assembly 26 is arranged in combination with the duct structure 24. During operation of the harvester 10, the fan assembly 26 serves to draw harvested cotton materials into the duct structure 24 from the harvesting structure 18. The fan assembly 26 furthermore serves to forcibly propel the harvested cotton materials upwardly through the duct structure 24 toward a discharge opening 28 deemed at a distal end of the duct structure 24. As will be appreciated by those skilled in the art, one or more duct structures 24 may be associated with each harvesting unit 18.

Figure 2:
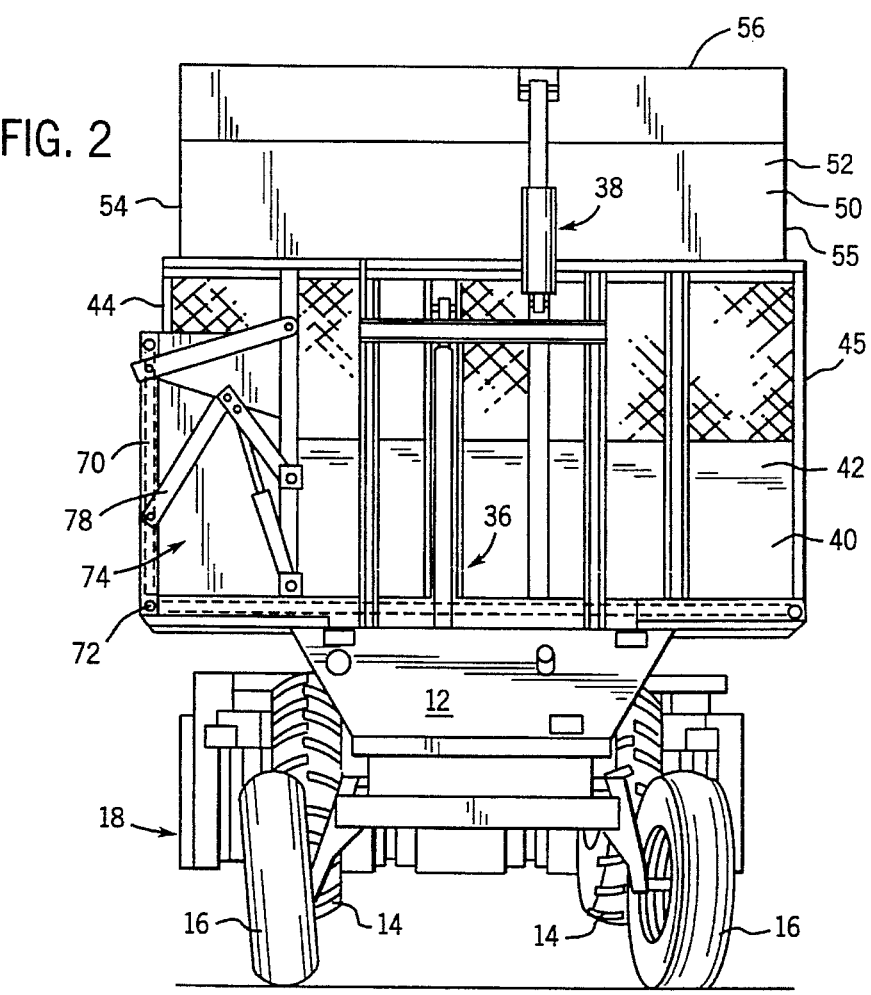
FIG. 2 is rear perspective view of the cotton harvester shown in FIG. 1 with the receptacle shown in an operational position.
Figure 4:
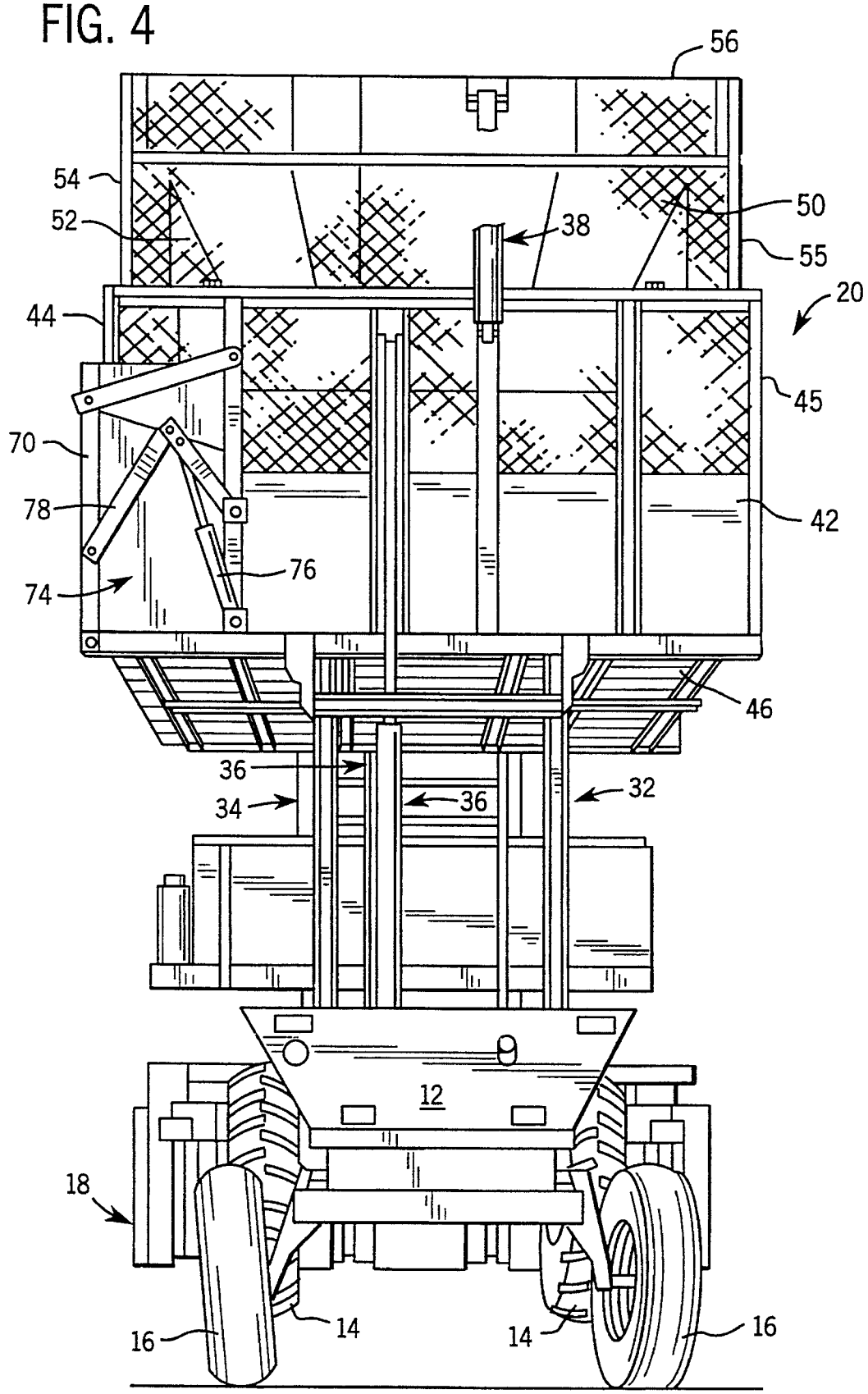
FIG. 4 is a rear perspective view similar to FIG. 2 but showing the receptacle in a raised cotton discharge position.

Receptacle 20 is mounted on the frame 12 of harvester 10 for elevational movement between an operational lower position (FIGS. 1 and 2) and a raised or discharge position (FIG. 4). In the illustrated embodiment, forward and rearward structures 32 and 34 (FIG. 4) guide the receptacle 20 for elevational movement. Receptacle 20 is elevationally positioned under the influence of lift actuators 36 preferably comprised of linearly distendable hydraulic cylinders that are controlled in a conventional manner preferably from the cab region 22 of the harvester 10. In a most preferred form of the invention, two hydraulic cylinders are provided at a front end of the receptacle 20 and one lift cylinder is provided toward a rear end of the receptacle 20.

Figure 3:
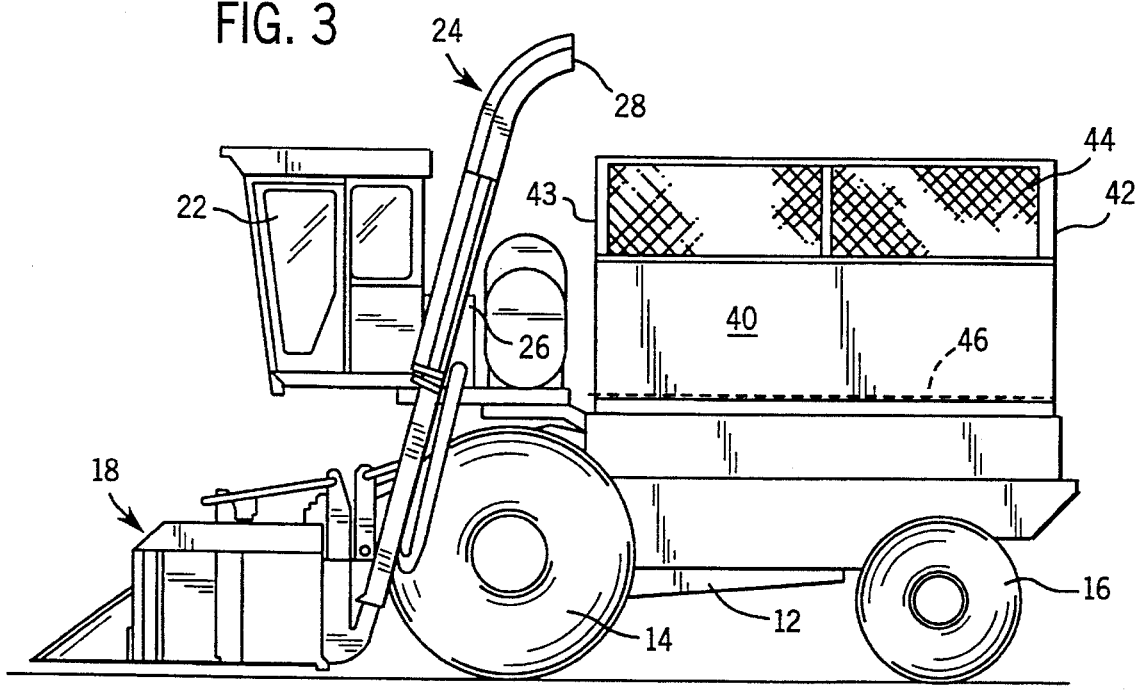
FIG. 3 is a side elevational view similar to FIG. 1 but showing an upper basket portion of the receptacle in a retracted storage position.

As shown in FIG. 1, receptacle 20 includes a lower basket portion 40 that is supported on and elevationally movable relative to the frame 12 under the influence of the lift actuators 36. Receptacle 20 further includes an upper basket portion 50 telescopically received by the lower basket portion 40. Basket extension actuators 38 (FIG. 2) elevationally position the upper basket portion 50 relative to the lower basket portion 40. As will be appreciated by those skilled in the art, the upper basket portion 50 elevationally moves between a raised field working position (FIGS. 1 and 2) and a lowered transport position (FIG. 3).

When the upper basket portion 50 of receptacle 20 is in a field working position (FIGS. 1 and 2), the capacity of receptacle 20 is substantially increased. When the harvester 10 is to be driven from one field location to another, or when placed for storage, the upper basket portion 50 of the receptacle 20 is positioned in its lower storage position to significantly reduced the overall height of the harvester and advantageously lower its center of gravity. The upper basket portion 50 of the receptacle 20 may further include a cotton compactor (not shown).

In the illustrated form of the invention, the lower basket portion 40 of receptacle 20 is a substantially rectangular open top structure. As shown, the basket portion 40 includes an aft end wall 42, a forward end wall 43, sidewalls 44 and 45 and a floor structure 46.

The upper basket portion 50 of receptacle 20 has a shape which generally corresponds to the shape of the interior of the lower basket portion 40 and is telescopically received in the lower basket portion 40 of receptacle 20 for vertical movement with respect thereto. The upper basket portion 50 includes a generally rectangularly shaped open bottom structure including an aft end wall 52, a forward end wall 53, sidewalls 54 and 55. As is conventional, walls 52, 53, 54 and 55 of the upper basket portion 40 are formed, at least in part, from metal screens fixedly supported on suitable framework well known in the art. The upper basket portion 50 of the receptacle 20 further includes a top or cover structure 56 that serves to prevent cotton materials blown into receptacle 20 from the duct structure 24 from inadvertently escaping through the top of the receptacle 20.

To optimize filing of receptacle 20, effective and efficient transfer of harvested cotton materials from the duct to structure 24 into the receptacle 20 is essential. In this regard, and as shown in FIG. 1, the discharge opening 28 of duct structure 24 is arranged to deliver harvested cotton materials to a forward and Upper portion of the receptacle 20. As is conventional, the forward wall 53 of the upper basket portion 50 of receptacle 20 is provided with a suitable inlet opening (not shown) arranged in general registry with the discharge opening 28 of the duct structure 24 when the upper basket portion 40 is elevationally arranged in a field working position. To prevent any interference or impacts when the upper basket portion 50 of the receptacle 20 is elevationally moved relative to the lower basket portion, a gap or opening 57 is defined between the distal end of the cotton conveying duct structure 24 and the front or forward wall 53 of the receptacle 20.

To promote effective and efficient transfer of harvested cotton materials between the duct structure 24 and the receptacle 20, a hood assembly, generally indicated as a whole by reference numeral 60, is carried by the upper basket portion 50 of the receptacle 20. The hood assembly 60 is designed and constructed to captively guide harvested cotton materials exhausted from the discharge opening 28 of the duct structure 24, through the inlet opening in the upper basket portion 50, and into the receptacle 20.

In one form, the hood assembly 60 can be substantially similar to the hood assembly disclosed in co-pending and co-assigned U.S. patent application Ser. No. 08/483,783 filed May 11, 1995. Suffice it to say, hood assembly 60 includes a hood structure 62 carried by the upper basket portion 50 of receptacle 20. The hood structure 62 preferably forms a portion of the top cover 56 of receptacle 20. Moreover, the hood structure 62 is mounted for generally horizontal movements between an extended position (FIG. 1) and a retracted position.

As shown in FIG. 1, when the hood structure 62 is in an extended position, and the upper basket portion 50 of receptacle 20 is in a field working position, a portion of the hood structure 62 extends vertically over and about a distal end of the duct structure 24. As such, the hood structure 62 is positioned to guide cotton materials exhausted from the discharge outlet 28 of the duct structure 24 into the receptacle 20.

As will be appreciated, if the upper basket portion 50 of receptacle 20 were telescoped to its storage or transport position with the hood assembly 60 in an extended position, as shown in FIG. 1, the hood structure 62 being of relatively rigid construction, would impact with the duct structure 24 causing possible damage thereto. Therefore, to permit the height of the receptacle 20 to be lowered for transport or storage, the hood structure 62 is moved to a retracted position prior to the upper basket portion 50 being telescopically lowered to a transporter storage position. Suffice it to say, when the hood assembly 60 is moved to a retracted position, the hood structure 62 is adequately removed from interfering or impacting with the duct structure 24 when the upper basket portion 50 of receptacle 20 is telescopically lowered to a storage or transport position.

To promote movement of the hood assembly 60 between its extended and retracted positions, a driver 64 (FIG. 5) is operably associated with the hood structure 62 (FIG. 1). In the illustrated embodiment, driver 64 is disposed between the receptacle 20 and the hood structure 62. In a most preferred form of the invention, the driver 64 comprises a generally linear distendable preferably hydraulic actuator or cylinder 68 (FIG. 5) disposed between the receptacle 20 and hood structure 62.

As is conventional, receptacle 20 further includes a door 70 through which cotton materials are discharged from the receptacle 20. In the illustrated embodiment, door 70 forms a portion of the sidewall 44 of the lower basket portion 40 of receptacle 20. As shown door 70 pivotally moves about a generally horizontal axis 72 (FIG. 1) disposed such that the door 70 is generally co-planar with the floor structure 46 of the receptacle 20 when the door 70 is swung open.

Door 70 is moved between its open and closed positions by a door motor assembly, generally indicated by reference numeral 74, preferably provided at the front and rear sides of the door 70. Since the door motor assemblies 74 are identical, only one will be shown and described with the understanding that the other door motor assembly is substantially identical. As shown, each door motor assembly 74 includes an actuator 76 preferably in the form of a double acting hydraulic cylinder. One end of cylinder 76 is connected to the receptacle 20 while the other end thereof is operably connected to the door. Preferably, a linkage assembly 78 operably interconnects the door actuator 76 to the door 70.

Referring now to FIG. 5, a control system 80 for operating the components of the receptacle 20 will be described in detail. In the illustrated embodiment, the control system 80 is configured as an electro/hydraulic system but it will be appreciated that other circuitry would equally suffice without detracting or departing from the spirit and scope of the present invention.

A source of hydraulic fluid under pressure 82 and a reservoir 84 are located on the harvester 10 and are connected in a conventional manner to a master control valve block 86. Amongst a series of other hydraulic components (not shown), valve block 86 includes a series of operator controlled valves 88, 90, 92 and 94 that are preferably operated from the cab region 22 of the harvester 10. Valves 88, 90, 92 and 94 are connected to the door actuator 76 through a door open/close circuit 96.

Operator controlled valves 88 and 90 operate in combination with each other and are connected to a close circuit 98 that serves to direct pressurized hydraulic fluid to the rod end of the actuators 76 thereby moving the door 70 on the receptacle 20 toward a closed position. Operator controlled valves 92 and 94 likewise operate in combination with each other and are connected to an open circuit 100 that serves to direct pressurized hydraulic fluid to the cylinder end of the actuators 76 thereby moving the door 70 of the receptacle 20 toward an open position. Notably, a one way valve 102 is interposed in the circuitry downstream of valve 88 to inhibit hydraulic fluid frown leaking from the rod end of the cylinders 76.

As shown, the source of pressurized fluid 82 is preferably a pump 103 that is mounted on and suitably driven by the harvester 10. The outlet of pump 103 is directed to both valves 88 and 92. Valves 88, 90, 92 and 94 are preferably solenoid operated valves that are normally biased into the position shown in FIG. 5. In the most preferred form of the invention, valves 88, 90, 92 and 94 are solenoid actuated valves that are spring biased into the position shown in FIG. 5.

In the position shown in FIG. 5, valve 88 blocks the flow of pressurized fluid from source 82 to the door actuators 76 and valve 90 blocks the fluid flow from the door actuators 76. When door 70 on receptacle 20 is to be closed, and in response to operator manipulation of a conventional switch (not shown) preferably arranged in the cab region 22 of the harvester 10, operator controlled valve 88 changes state from the position shown in FIG. 5. When valve 88 changes state, pressurized hydraulic fluid passes from pump 103 through valve 102 and into the closed circuit 98. From the closed circuit 98, pressurized hydraulic fluid is introduced to the rod end of the actuator 76 thereby closing the door 70 on the receptacle. As mentioned, valves 88 and 90 operate in combination relative to each other. That is, when valve 88 changes state, valve 90 likewise changes state. When valve 90 changes state, it shifts from the position shown in FIG. 5 and opens the circuit 100 to exhaust thereby permitting fluid at the cylinder end of the actuator 76 to pass into the reservoir 84.

In the position shown in FIG. 5, valve 92 blocks the fluid flow from the source 82 to the door actuators 76 and valve 94 blocks the flow of fluid flow from the door actuators 76. When door 70 on receptacle 20 is to be opened, and in response to operator manipulation of a switch (not shown) in the cab region 22 of the harvester 10, the operator controlled valve 92 changes state from the position shown. As mentioned above, both valves 88 and 92 in valve block 86 are connected to the source of pressurized fluid 82. Accordingly, when operator controlled valve 92 changes state, pressurized hydraulic fluid is permitted to pass through the valve 92 into the open circuit 100 and thence to the cylinder end of the door actuator 76. As mentioned above, valves 92 and 94 operate in combination relative to each other. Thus, when operator controlled valve 92 changes state, operator controlled valve 94 likewise changes state. When operator controlled valve 94 changes state, the closed circuit 96 is open to exhaust. Accordingly, fluid at the rod end of actuator 76 is permitted to exhaust to the reservoir 84.

Notably, the valve 102 inhibits fluid from leaking from the rod end of the actuator 76 when neither of the valves 88 nor 92 are operated. Accordingly, valve 102 serves to maintain the door 70 of receptacle 20 in a closed position.

The control system 80 of the present invention further includes electro/hydraulic circuitry 104 for operating the upper basket portion 50 of receptacle 20 and the hood assembly 60 in timed or sequential relation relative to each other. Circuit 104 preferably includes a valve body 106 which, in the illustrated embodiment, is mounted on the receptacle 20. To significantly reduce the hydraulic lines leading from the source of fluid pressure 82, the valve body 106 is preferably connected to the open/close circuit 96 of the control system. During operation of the harvester, and to significantly reduce the number of hydraulic lines leading from the source of pressure 82, the valve body 106 is hydraulically and operationally connected via supply conduit 107 to the door close circuit 98 of the control system 80.

Turning to FIG. 6, valve body 106 preferably includes a plurality of components including an operator controlled supply valve 108, an operator controlled basket extension valve 110, an operator controlled hood valve 112, a pair of pressure sequencing valves 114 and 116, and a one way valve 118. Notably, valves 108, 110 and 112 are preferably configured as solenoid actuated valves that are normally biased into the positions shown in FIG. 6. In a most preferred form of the invention, the valves 108, 110 and 112 are spring biased into the position shown in FIG. 6.

Figure 7:
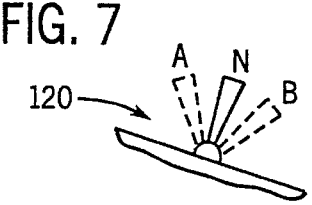
FIG. 7 is a schematic representation of a switch for controlling various components of the electro/hydraulic control system of the present invention.

As shown in FIG. 7, an operator controlled switch 120 is preferably arranged in the cab region 22 of the harvester 10 for operating valves 108, 110 and 112. In the illustrated embodiment, switch 120 is a three position, momentary switch. Switch 120 is normally retained in a central neutral position wherein none of the valves 108, 110 or 112 are affected by switch 120. When switch 120 is moved to position A, valves 108 and 110 change state. When switch 120 is moved to position B, valves 108 and 112 change state.

In the illustrated embodiment, and returning to FIG. 6, valve 112 is provided with an intake port 124, an exhaust port 126, and two motor ports 128 and 130. Valve 112 further includes a linearly shiftable valve spool 132 that is biased preferably under the influence of a spring 134 and controls the flow between valve ports 124, 126, 128 and 130. As shown in FIG. 5, intake port 124 is normally connected to motor port 128 of valve 112 and motor port 130 is normally open to exhaust. As shown, motor port 128 is operably connected to the cylinder end of the hood actuator 64 while motor port 130 is operably connected to the rod end of the hood actuator 64.

As shown, valves 114 and 116 are normally biased into position to prevent fluid flow therethrough. Preferably, valves 114 and 116 are spring biased into the positions shown. Notably, the sequencing valve 114 is operably disposed between valves 108 and 112. Moreover, sequencing valve 114 is responsive to the fluid pressure applied to the basket extension valve 110. Sequencing valve 116 is operably disposed downstream of valves 110 and 118. In operation, sequencing valve is responsive to the fluid pressure applied to the hood valve 112. In the illustrated embodiment, valve 118 is arranged downstream of valve 110 and upstream of valve 116.

During field operation of the harvester 10, the upper basket portion 50 of receptacle 20 is normally in a raised field working position relative to the lower basket portion 40 to increase the holding capacity of the receptacle 20. The control system 80 is configured to maintain the upper basket portion 50 of receptacle 20 in a raised elevation through the action of the valves 116 and 118. Moreover, during a field operation, the hood assembly 60 is maintained in its extended position schematically represented in FIG. 1. As such, the hood assembly 60 serves to guide harvested cotton materials exhausted from the duct structure 24 into the receptacle 20.

Following the discharge of cotton materials from the receptacle 20, it may be desirable to elevationally position the upper basket portion 50 of receptacle 20 in a lower transport or storage position to facilitate transportation of the machine 10 from one location to another. With the hood assembly 60 extended, however, inadvertent lowering of the upper basket portion 50 can result in significant damage to the duct structure 24. The control system 80 of the present invention is configured, however, to effect sequential or timed movement of the receptacle components relative to each other thereby inhibiting inadvertent and other forms of damage to the duct structure 24 from the hood assembly 60 impacting therewith.

Following the discharge of harvested cotton materials from the receptacle 20, the door 70 on receptacle 20 is normally closed. As will be appreciated by those skilled in the art, there are advantages to operating and normally maintaining the harvester with the door 70 arranged in a closed position. Because the door 70 and the elevated position of the upper basket portion 50 of receptacle 20 are independent of one another, operationally interconnecting the movements of the upper basket portion 50 and the hood assembly 60 with the door open/close circuitry 96 advantageously eliminates additional plumbing requirements and simplifies the hydraulic circuitry for the harvester 10. It should be appreciated, however, that the logic associated with the control system of the present invention would equally apply if the actuating force used to elevationally position the upper basket portion 50 and hood structure 60 in timed or sequential relation relative to each other were derived from other than the door open/close circuitry 96.

In the illustrated embodiment, to move the upper basket portion 50 of receptacle 20 to a lowered transport position, valve 88 in valve block 86 is operated to change state from that position shown in FIG. 5. As such, fluid under pressure is directed from the fluid pressure source 82, through valve 88, into the close circuit 96, and thence to the rod end of the door actuator 76. Simultaneously, fluid pressure in the close circuit 98 is likewise directed to valve 108 through supply line 107. Since the door 70 of receptacle 20 is already closed, however, the introduction of pressurized fluid to the actuator 76 has no effect on the door 70. Also, to effect movement of the upper basket portion 50 to a lowered transport position, the operator moves switch 120 from the neutral position shown in FIG. 7 to position B thus causing valves 108 and 112 in valve body 106 of the control system 80 to shift or change state from the position shown.

When supply valve 108 is shifted from the position shown in FIG. 6, pressurized fluid is supplied to valve 110. In the position shown, however, valve 110 is configured to prevent the flow of fluid therepast. Thus, there is an increase in fluid pressure applied to valve 110. A pilot line 140 detects this pressure increase applied to valve 110 and applies fluid pressure to the sequencing valve 114 thereby causing the sequencing valve 114 to shift from the position shown and, thus, supply pressurized fluid from the supply valve 108 to port 124 of valve 112.

As mentioned, when the operator moves switch 120 from the neutral position shown in FIG. 7 to position B, solenoid valve 112 shifts from the position shown in FIG. 6 to its other state. When valve 112 shifts to its other state, the pressurized fluid directed to port 124 is directed to the rod end of the hood driver 68 thereby retracting the hood assembly 60. As mentioned above, retraction of the hood assembly 60 is sufficient to remove the hood structure 62 from contacting or impacting with the duct structure 24.

After the hood motor or actuator 68 has reached the limits of its retracting stroke, the continued supply of fluid to valve 112 will cause the fluid pressure to raise at port 130. A pilot line 142 detects this increase in pressure at port 130 of valve 110 and applies fluid pressure to the sequencing valve 116 thereby causing the sequencing valve 116 to shift and, thus, connecting the basket extension actuators 76 to exhaust. As will be appreciated, connecting the basket extension actuators 76 to exhaust results in the upper basket portion 50 being lowered to a transport or storage position. It is important to note, however, that the movement of the hood assembly 60 and upper basket portion 50 are in timed or sequential relation relative to each other. That is, when the upper basket portion 50 is to be lowered to a storage position, the hood assembly 60 is first retracted followed by the upper basket portion 50 of receptacle 20 being lowered to a storage position.

To move the upper basket portion 50 of receptacle 20 from a lowered storage position to a raised or field working position, valve 88 is positioned to direct pressurized fluid from the source of fluid pressure 82 into the close circuit 98. Also, the operator moves switch 120 from the neutral position shown in FIG. 7 to position A thereby causing the supply valve 108 and basket extension valve 110 to shift or change state from the position shown in FIG. 6. As mentioned above, when valve 108 is shifted from the position shown in FIG. 6, pressurized fluid is directed to valve 110. Because valve 110 is likewise shifted as a result of movement of switch 120, pressurized fluid is permitted to pass through valve 110 and to the basket extension actuators 38. Notably, with valve 110 shifted from the position shown in FIG. 6, the fluid pressure in line 140 is initially inadequate to cause sequencing valve 114 to shift from the normally biased position shown in FIG. 6 thus blocking fluid from moving therepast. Accordingly, the pressurized fluid passing from the supply valve 108 is directed through the basket extension valve 110. Moreover, valve 118 has no effect on the fluid passing from valve 110. Because valve 114 blocks the passage of fluid to valve 112, the fluid pressure sensed in pilot line 142 is inadequate to shift sequencing valve 116 from the normally biased position shown in FIG. 6. Accordingly, the basket extension actuators 38 are blocked from exhaust and are supplied with adequate fluid pressure to effect extension thereof thus raising the upper basket portion 50 of receptacle 20 into its raised field working position.

After the basket extension actuators 38 reach the limit of their extended stroke, continued supply of fluid to valve 110 will cause the fluid pressure monitored by the pilot line 140 to raise. Ultimately, the pressure in pilot line 140 is raised to an extent thereby shifting sequencing valve 114 from the position shown in FIG. 6. Thus, pressurized hydraulic fluid is passed from supply valve 108 to port 124 of valve 112. Notably, valves 116 and 118 combine to maintain the upper basket portion 50 in a raised field working position.

In the position shown in FIG. 6, valve 112 will thereafter allow pressurized fluid to pass from port 124 to port 128 and thence to the cylinder end of the hood actuator 68 thereby effecting extension of the hood assembly 60. It is important to note, however, that the upper basket portion 50 of the receptacle 20 is elevated to its fully raised position prior to the hood assembly 60 being extended outwardly away from the basket portion. Thus, with the upper basket portion 50 of receptacle 20 in its fully raised position, there is no concern over the hood assembly 60 impacting or interfering with the distal end of the duct structure 24.

The present invention thus provides a relatively large cotton receptacle 20 with upper and lower basket portions 40 and 50 to allow the height of the receptacle to be adjusted relatively quickly and easily with minimum manual involvement. The receptacle 20 further includes an extendible and retractable hood assembly 60 for enhancing and promoting the flow of harvested cotton materials from a distal end of the duct structure 24 into the receptacle 20. A salient feature of the present invention relates to a control system 80 that systematically moves the upper basket portion 50 of receptacle 20 and the hood assembly 60 in sequential or timed relation relative to each other thereby removing the possibility of human error resulting in physical impact or damage to the duct structure 24. The electro/hydraulic structure of the control system sequentially moves the hood assembly 60 and the upper basket portion 50 relative to each other whereby the hood assembly 60 is moved to a retracted position prior to the upper basket portion 50 being moved to its storage position and such that the upper basket portion 50 is moved to a field working position prior to the hood assembly 60 being moved to an extended position. Moreover, by interfacing the control system 80 of the present invention with the open/close circuit 96 existing on a conventional harvester, there is a substantial reduction in the number of hydraulic lines extending from the pump 82 thereby reducing the manufacturing costs and further simplifying the plumbing or circuitry on the harvester 10.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for a cotton harvester having a frame, harvesting row units for harvesting cotton materials, elevating structure for moving cotton materials form the row units to a receptacle wherein cotton materials are received and held, said receptacle including a lower basket portion with an upper basket portion being elevationally positionable relative to the lower basket portion, and with the upper basket portion having movably mounted thereon a hood assembly for guiding cotton materials from the elevating structure into the receptacle, said control system comprising:

a first actuator for telescopically moving the upper basket portion relative to the lower basket portion;

a second actuator for moving the hood assembly relative to the upper basket portion of the receptacle between an extended position, whereat the hood assembly is arranged proximate to an elevated free end of said elevating structure, and a retracted position, whereat the hood assembly is removed from the elevated free end of the elevating structure; and electro/hydraulic circuitry operably connected to said first and second actuators for moving said upper basket portion and said hood assembly in timed relation relative to each other.

2. The control system according to claim 1 wherein said first actuator includes a pair of hydraulically interconnected extendable/retractable hydraulic cylinders for elevationally moving the upper basket portion relative to the lower basket portion.

3. The control system according to claim 1 wherein said second actuator comprises an extendable/retractable cylinder connected between said hood assembly and the upper basket portion of the receptacle.

4. The control system according to claim 1 wherein said electro/hydraulic circuitry includes a fluid pressure source and a series of operator controlled valves interposed between said fluid pressure source and the actuators for selectively operating the hood assembly along with the upper and lower basket portions of the receptacle.

5. A control system for a cotton harvester including a frame, harvesting structure arranged on the frame for removing cotton materials from plants, duct structure extending from the harvesting structure to a receptacle, said receptacle including a lower basket portion mounted on the frame, an upper basket portion that is elevationally positionable relative to the lower basket portion, and a hood assembly carried by the upper basket portion for generally horizontal movement between an extended position whereat the hood assembly is positioned to guide cotton materials exhausted from the duct structure into the receptacle and a retracted position, said control system comprising:

a first actuator for elevationally positioning the upper basket portion relative to the lower basket portion;

a second actuator for positioning the hood assembly between extended and retracted positions relative to the duct structure, wherein said hood assembly is, in said extended position a portion of the hood assembly is arranged proximate to a distal end of said duct structure, and wherein when said hood assembly is in said retracted position the hood assembly is removed from the distal end of the duct structure; and circuitry operably connected to said first and second actuators for moving said upper basket portion and said hood assembly in sequenced relation relative to each other.

6. The control system according to claim 5 wherein said first actuator includes a series of hydraulically powered extendable/retractable hydraulic cylinders arranged between said upper and lower basket portions.

7. The control system according to claim 5 wherein said second actuator comprises a hydraulic cylinder connected between said upper basket portion and the hood assembly.

8. The control system according to claim 5 wherein said circuitry includes valves for actuating a selected one of said actuators and preventing simultaneous operation of the other one of said actuators.

9. The control system according to claim 8 wherein said circuitry comprises a series of operator controlled valves connected between a source of power and said actuators.

10. A control system for a cotton harvester including a frame, harvesting structure arranged on the frame for removing cotton materials from plants, duct structure extending from the harvesting structure to a receptacle, said receptacle including a lower basket portion mounted on the frame, said lower basket portion including a door through which cotton materials are removed from the receptacle, an upper basket portion that is elevationally positionable relative to the lower basket portion, and a hood assembly carried by the upper basket portion for generally horizontal movement between an extended position whereat the hood structure guides cotton materials exhausted from the duct structure into the receptacle and a retracted position, said control system comprising:

a source of fluid pressure;

a door actuator for positioning the door between open and closed positions;

door open/close circuitry for selectively connecting said source of fluid pressure to said door actuator thereby selectively moving said door between said open and closed positions;

a basket extension actuator for elevationally positioning the upper basket portion relative to the lower basket portion;

a hood assembly actuator for positioning the hood assembly relative to a distal end of the duct structure between extended and retracted positions, wherein when said hood assembly is in said extended position the hood assembly is arranged proximate to the distal end of said duct structure, and wherein when said hood assembly is in said retracted position the hood assembly is removed from the distal end of said duct structure; and electro/hydraulic circuitry connected to said door open/close circuitry for controlling operation of said basket and said hood actuators such that said upper basket portion and said hood assembly are moved in sequential relation relative to each other.

11. The control system according to claim 10 wherein said door actuator comprises a pair of linearly distendable/retractable hydraulic cylinders operably connected between said lower basket and said door.

12. The control system according to claim 10 further including a valve body mounted on said receptacle and including valve structure including a series of operator controlled valves interposed between said fluid pressure source and said basket extension and hood assembly actuators.

13. The control system according to claim 12 wherein said valve structure includes a pressure responsive sequencing valve operably interposed between said operator controlled valves and said hood assembly actuator.

14. A cotton harvester basket structure arranged in combination with cotton conveying duct structure leading thereto and hydraulic control circuitry for said basket structure, comprising:

a cotton receiving receptacle having upper and lower basket portions connected to each other, with the upper basket portion mounted for elevational movement relative to the lower basket portion between a field working position and a storage position;

a basket extension actuator for elevationally moving the upper basket portion relative to said lower basket portion between said field working position and said storage position;

a hood assembly carried by the upper basket portion for movement along a generally horizontal path of travel between a first extended position, whereat the hood structure is arranged proximate to a distal end of said duct structure, and a second retracted position, whereat the hood structure is removed from the distal end of the duct structure;

a hood actuator for moving the hood assembly between the first and second positions; and circuitry for sequentially moving said hood assembly and said upper basket portion relative to each other whereby the hood assembly is moved to a retracted position prior to said upper basket portion being moved to said storage position and such that the upper basket portion is moved to a field working position prior to the hood assembly being moved to an extended position.

15. The basket structure according to claim 14 wherein said circuitry comprises a series of operator controlled electro/hydraulic valves and pressure responsive sequencing valves operably interposed between said actuators and a source of fluid pressure.

16. The basket structure according to claim 15 wherein said electro/hydraulic valves and said sequencing valves are carried in a valve body mounted on the receptacle.

17. The basket structure according to claim 14 wherein said lower basket portion of said receptacle includes a movable door, an actuator connected between said door and said receptacle, and open/close circuitry including operator controlled valve structure for selectively positioning the door between open and closed positions.

18. The basket structure according to claim 17 wherein said circuitry for moving said hood assembly and said upper basket portion is operably connected to and derives power from the door open/close circuitry.

19. The basket structure according to claim 14 wherein said basket actuator comprises three extendable/retractable hydraulic cylinders arranged in a master/slave relationship relative to each other.

* * * * *